United States Patent
Jeong et al.

(10) Patent No.: US 11,116,022 B2
(45) Date of Patent: Sep. 7, 2021

(54) METHOD FOR RELAYING MESSAGES IN LOW POWER WIDE AREA NETWORK AND APPARATUS THEREFOR

(71) Applicant: Electronics and Telecommunications Research Institute, Daejeon (KR)

(72) Inventors: Wun Cheol Jeong, Daejeon (KR); Eun Hee Kim, Daejeon (KR); Tae Joon Park, Daejeon (KR); Geon Min Yeo, Daejeon (KR); Kye Seon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 104 days.

(21) Appl. No.: 16/733,153

(22) Filed: Jan. 2, 2020

(65) Prior Publication Data
US 2020/0314927 A1 Oct. 1, 2020

(30) Foreign Application Priority Data
Mar. 29, 2019 (KR) .................. 10-2019-0036510

(51) Int. Cl.
| | | |
|---|---|---|
| *H04W 4/00* | (2018.01) | |
| *H04W 76/14* | (2018.01) | |
| *H04L 27/36* | (2006.01) | |
| *H04W 88/18* | (2009.01) | |
| *H04L 1/00* | (2006.01) | |
| *H04W 24/08* | (2009.01) | |

(52) U.S. Cl.
CPC .......... *H04W 76/14* (2018.02); *H04L 1/0061* (2013.01); *H04L 27/364* (2013.01); *H04W 24/08* (2013.01); *H04W 88/184* (2013.01)

(58) Field of Classification Search
CPC ..... H04L 1/0061; H04L 5/001; H04L 5/0053; H04L 5/0091; H04L 27/0006; H04L 27/36; H04L 27/364; H04W 16/26; H04W 24/04; H04W 24/08; H04W 76/14; H04W 76/18; H04W 84/04; H04W 88/04; H04W 88/18; H04W 88/184; Y02D 30/70
See application file for complete search history.

(56) References Cited

U.S. PATENT DOCUMENTS

| | | | |
|---|---|---|---|
| 8,031,604 B2 | 10/2011 | Sydir et al. | |
| 8,483,106 B2 | 7/2013 | Hwang et al. | |
| 10,178,449 B1* | 1/2019 | Struhsaker | ............... H04Q 9/00 |
| 10,212,577 B2* | 2/2019 | O'Connell | ............... H04W 8/12 |
| 10,277,234 B2* | 4/2019 | Sennoun | ........... H04W 52/0254 |

(Continued)

OTHER PUBLICATIONS

Farrell, LPWAN Overview, Internet-Draft, 43 pages, Feb. 7, 2018.*

*Primary Examiner* — Frank Duong
(74) *Attorney, Agent, or Firm* — William Park & Associates Ltd.

(57) ABSTRACT

Disclosed are methods and apparatuses for relaying messages in LPWAN. An operation method of a terminal may comprise transmitting a first join request message to a base station without IQ inversion; when a number of failed transmissions of the first join request message is greater than or equal to a preconfigured threshold, transmitting an IQ-inverted second join request message to a relay; and receiving a join response message from the relay that is a response to the second join request message. Accordingly, the performance of the communication system can be improved.

13 Claims, 5 Drawing Sheets

(56) References Cited

U.S. PATENT DOCUMENTS

| | | | |
|---|---|---|---|
| 10,326,518 B1* | 6/2019 | Magley | H04B 7/15528 |
| 10,567,495 B2* | 2/2020 | Gandhi | H04W 12/088 |
| 2008/0032651 A1 | 2/2008 | Rietman et al. | |
| 2010/0317383 A1 | 12/2010 | Lee et al. | |
| 2015/0358069 A1 | 12/2015 | Aboul-Magd et al. | |
| 2018/0242111 A1 | 8/2018 | Hill | |
| 2018/0338311 A1 | 11/2018 | Yeo et al. | |
| 2020/0107402 A1* | 4/2020 | Di Girolamo | H04W 48/17 |
| 2021/0099349 A1* | 4/2021 | Lee | H04W 88/16 |

* cited by examiner

METHOD FOR RELAYING MESSAGES IN LOW POWER WIDE AREA NETWORK AND APPARATUS THEREFOR

CROSS-REFERENCE TO RELATED APPLICATIONS

This application claims priority to Korean Patent Application No. 10-2019-0036510 filed on Mar. 29, 2019 with the Korean Intellectual Property Office (KIPO), the entire contents of which are hereby incorporated by reference.

BACKGROUND

1. Technical Field

The present disclosure relates generally to a technique for communications in a low power wide area network (LP-WAN), and more specifically, to a technique for relaying messages for service coverage expansion in a LPWAN.

2. Related Art

With the development of information and communication technology, various wireless communication technologies are being developed. The wireless communication technology is classified into wireless communication technology using a licensed band, and wireless communication technology using an unlicensed band (e.g., industrial scientific medical (ISM) band) according to a band used. Since the license of the licensed band is exclusively given to one operator, the wireless communication technology using the licensed band may provide better reliability and communication quality than the wireless communication technology using the unlicensed band.

The representative wireless communication technologies using the licensed bands include long term evolution (LTE), LTE-advanced (LTE-A), and new radio (NR), which are defined in the 3rd generation partnership project (3GPP) standard. Each of a base station and a user equipment (UE) supporting the communication technology defined in the 3GPP standard may transmit and receive signals through a licensed band. The representative wireless communication technologies using the unlicensed bands include wireless local area network (WLAN) which is defined by the Institute of Electrical and Electronics Engineers (IEEE) 802.11 standard, wireless personal area network (WPAN) which is defined by the IEEE 802.15 standard, and the like. A communication node supporting WLAN or WPAN may transmit and receive signals through an unlicensed band.

Meanwhile, Internet of Things (IoT) may be applied to various industrial and service business models. For example, the IoT may be applied to home appliances, automobiles, facility management, smart buildings, and the like. The IoT may be implemented through WLAN and WPAN (e.g., Bluetooth, ZigBee, etc.). However, since communication coverages of WLAN and WPAN are relatively short, there are limitations in providing various IoT services.

In order to solve such the problem, a low power wide area network (LPWAN) may be applied to the IoT. The LPWAN may provide low power, low communication speed, and wide communication coverage. The LPWAN may be classified into a licensed band LPWAN and an unlicensed band LPWAN. The licensed band LPWAN may include 3GPP NB-IoT, and the unlicensed band LPWAN may include SigFox, LoRa, IEEE 802.15.4w, or the like. In the LPWAN, signals may be transmitted in a line of sight (LoS) scheme, in which case a service shadow area may occur. There is a need for technology to resolve such the service shadow area.

SUMMARY

Accordingly, exemplary embodiments of the present disclosure provide a method and an apparatus of relaying messages for service coverage expansion in a communication system.

According to an exemplary embodiment of the present disclosure, an operation method of a terminal in a communication system may comprise transmitting a first join request message to a base station without IQ inversion; when a number of failed transmissions of the first join request message is greater than or equal to a preconfigured threshold, transmitting an IQ-inverted second join request message to a relay; and receiving a join response message from the relay that is a response to the second join request message, wherein the second join request message is transmitted to the base station through the relay, and the join response message is generated by the base station.

The first join request message may be transmitted through a first channel used for direct communication between the terminal and the base station, and the second join request message may be transmitted through a second channel used for communication through the relay.

When the number of failed transmissions of the first join request message is less than the preconfigured threshold, a transmitter included in the terminal may operate to transmit a non-IQ-inverted message, and a receiver included in the terminal may operate to receive an IQ-inverted message.

When the number of failed transmissions of the first join request message is greater than or equal to the preconfigured threshold, a transmitter included in the terminal may operate to transmit an IQ-inverted message, and a receiver included in the terminal may operate to receive a non-IQ-inverted message.

The join response message may be a join response message that is non-IQ-inverted.

According to another exemplary embodiment of the present disclosure, an operation method of a relay in a communication system may comprise performing a monitoring operation on a channel; performing a decoding operation on a message received in the channel when the message is IQ-inverted; and retransmitting the message when the decoded message is valid, wherein the retransmitted message is a message that is IQ-inverted.

The channel may be a first channel used for communication through the relay, and the first channel may be different from a second channel used for communication between a base station and a terminal.

The message may be retransmitted through the first channel.

The validity of the decoded message may be determined based on a cyclic redundancy check (CRC).

The relaying operation may be performed when an IQ-inverted message is received in the channel, and the relaying operation may not be performed when a non-IQ-inverted message is received in the channel.

According to yet another exemplary embodiment of the present disclosure, a terminal in a communication system may comprise a processor; a transmitter performing a transmission operation according to control of the processor; a receiver performing a reception operation according to control of the processor; and a memory storing at least one instruction executable by the processor, wherein the at least one instruction configures the processor to transmit a first join request message to a base station without IQ inversion; when a number of failed transmissions of the first join request message is greater than or equal to a preconfigured threshold, transmit an IQ-inverted second join request message to a relay; and receive a join response message from the relay that is a response to the second join request message, wherein the second join request message is transmitted to the base station through the relay, and the join response message is generated by the base station.

The first join request message may be transmitted through a first channel used for direct communication between the terminal and the base station, and the second join request message may be transmitted through a second channel used for communication through the relay.

When the number of failed transmissions of the first join request message is greater than or equal to the preconfigured threshold, a transmitter included in the terminal may operate to transmit an IQ-inverted message, and a receiver included in the terminal may operate to receive a non-IQ-inverted message.

According to the exemplary embodiments of the present disclosure, in a network join procedure, the terminal may transmit a join request message without IQ inversion. When the join request message that is not IQ-inverted is received, the relay may not retransmit the join request message. If the number of failed transmissions of the join request message is greater than or equal to a threshold, the terminal may determine that a base station does not exist within its communication coverage. In this case, the terminal may transmit a join request message that is IQ-inverted.

When the IQ-inverted join request message is received, the relay may retransmit the corresponding join request message without IQ inversion. A base station may receive the join request message from the relay, and may transmit a join response message that is a response to the join request message. Here, the join response message may be an IQ-inverted message. Upon receiving the IQ-inverted join response message, the relay may retransmit the corresponding join response message without IQ inversion. The terminal may receive the join response message from the relay. When the transmission and reception procedure of the join request and response messages is completed, the terminal may join the network. Since the communication coverage is increased by the relay, the performance of the communication system can be improved.

BRIEF DESCRIPTION OF DRAWINGS

Embodiments of the present disclosure will become more apparent by describing in detail embodiments of the present disclosure with reference to the accompanying drawings, in which.

Figure 1:
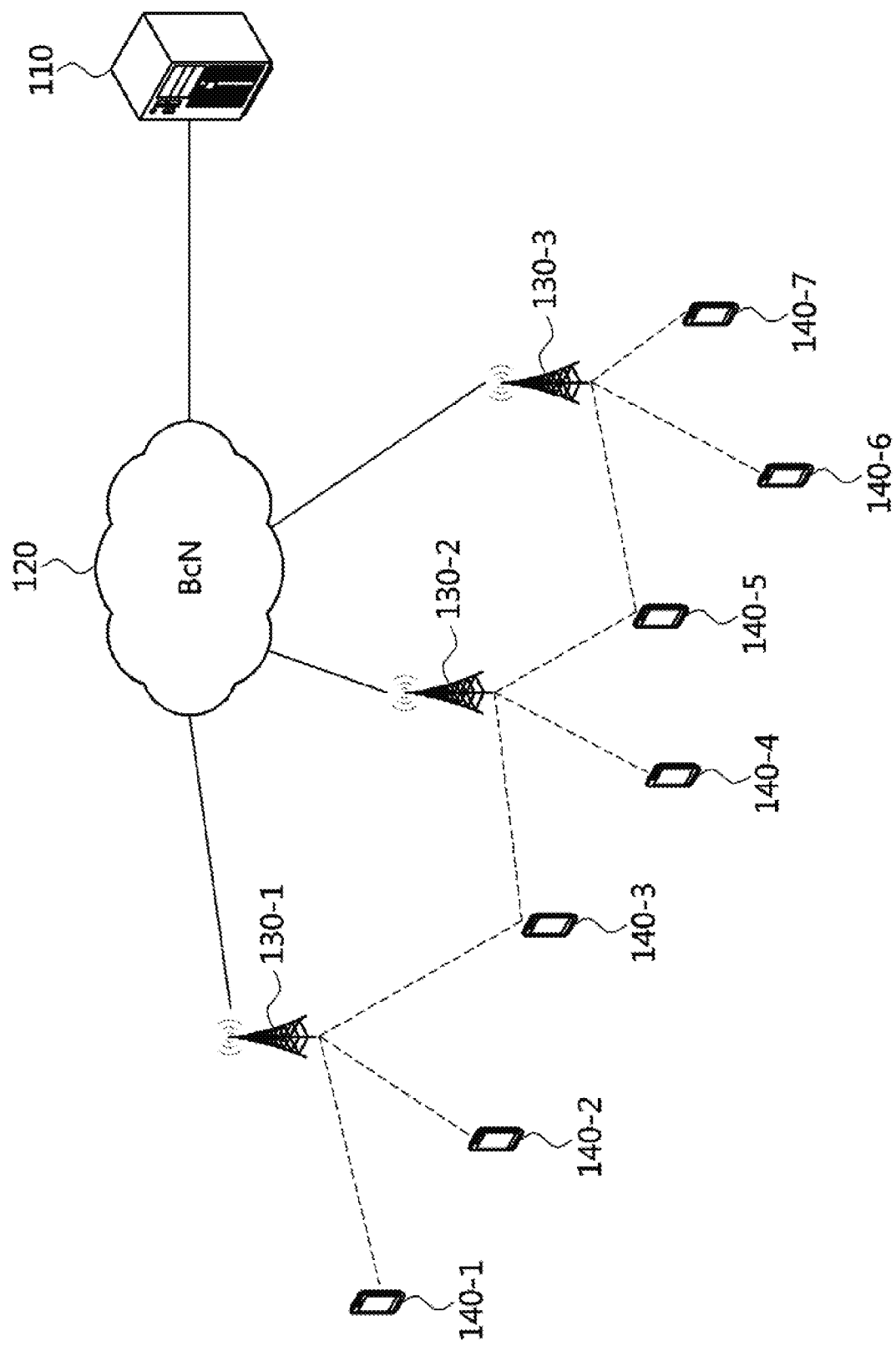
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which embodiments of the present disclosure are applied will be described. The communication system to which the embodiments according to the present disclosure are applied is not limited to the following description, and the embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system may include a server 110, a broadband convergence network (BcN) 120, base stations 130-1 to 130-3, and terminals 140-1 to 140-7. The communication system may be a low power wide area network (LPWAN). For example, the communication system may be a communication system for SigFox, LoRa, IEEE 802.15.4w, or narrowband-Internet of Things (NB-IoT).

The server 110 may be connected to the BcN 120 via a wired link, the BcN 120 may be connected to the base stations 130-1 to 130-3 via wired links, and the base stations 130-1 to 130-3 may be connected to the terminals 140-1 to 140-7 through wireless links. The server 110 may be referred to as a 'controller'. The server 110 may transmit a command for instructing to perform a specific function/operation to the terminals 140-1 to 140-7 through the BcN 120 and the base stations 130-1 to 130-3.

Each of the base stations 130-1 to 130-3 may be referred to as a 'gateway', and each of the terminals 140-1 to 140-7 may be a low power terminal. The terminals 140-1 to 140-7 may transmit an uplink message to the one or more base stations 130-1 to 130-3. Downlink messages may be transmitted to the terminals 140-1 to 140-7 through one of the base stations 130-1 to 130-3. The base stations 130-1 to 130-3 and the terminals 140-1 to 140-7 may be configured as follows.

Figure 2:
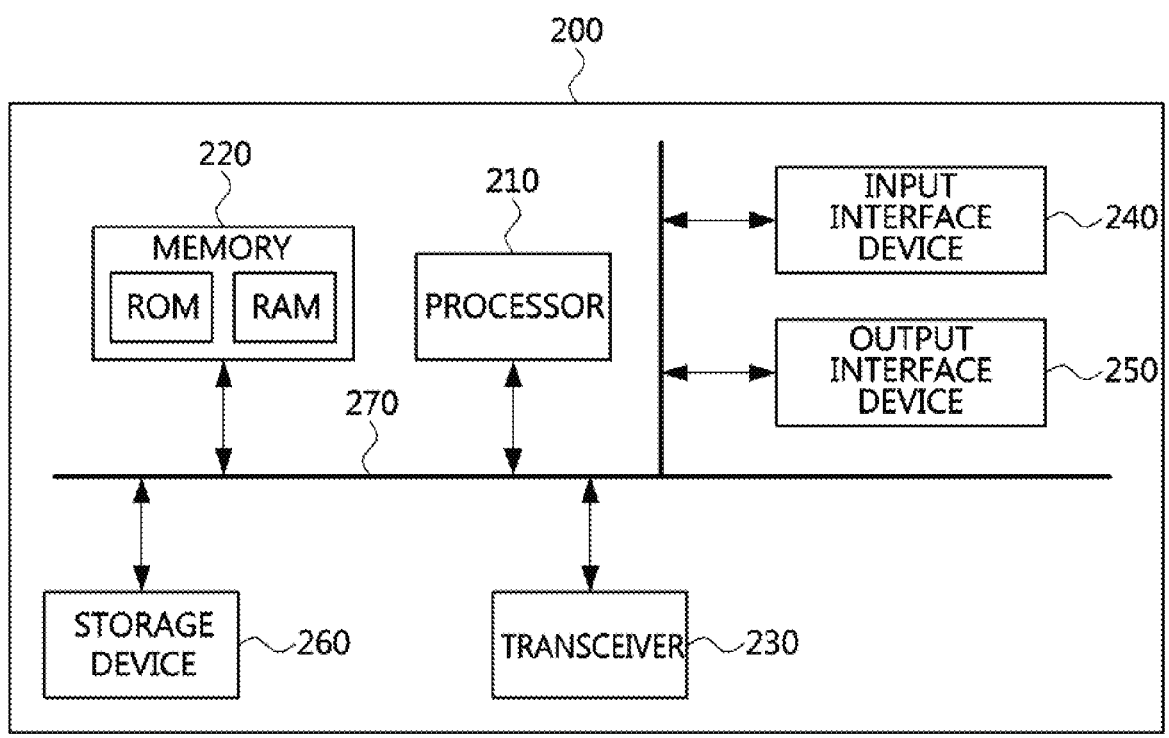
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected through a separate interface or a separate bus around the processor 210, instead of the common bus 270. For example, the processor 210 may be connected to at least one of the memory 220, the transceiver 230, the input interface device 240, the output interface device 250, and the storage device 260 through a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, communications between the base stations 130-1 to 130-3 and the terminals 140-1 to 140-7 may be performed using a chirp spread spectrum (CSS) scheme. In this case, when a low data rate is used in a communication environment where line-of-sight (LoS) is secured, communication coverage may be 10 km or more. When the communication coverage is 10 km or more, communications between the base stations 130-1 to 130-3 and the terminals 140-1 to 140-7 may be performed without a relay. Therefore, delay and transmission/reception complexity due to the relay may be minimized.

However, when the LoS between the base stations 130-1 to 130-3 and the terminals 140-1 to 140-7 is not secured, a shadow area may occur, thereby reducing the communication coverage. In particular, due to the reduction of the communication coverage in urban areas, a received signal quality may be degraded. In order to eliminate the shadow area and increase the communication coverage, relays may be introduced into the communication system.

The relay may operate in a repeater scheme or a relaying scheme. The relay operating in the repeater scheme may amplify a received signal without demodulation/decoding operation, and may retransmit the amplified signal. The relay operating in the repeater scheme may be simply implemented. However, since interference included in the received signal and a noise generated during a processing of the received signal are amplified together, the signal quality may be degraded.

The relay operating in the relaying scheme may perform demodulation/decoding operation on the received signal, perform validity check (e.g., cyclic redundancy check (CRC)) on the decoded received signal, and retransmit a valid signal. Therefore, the quality of the signal may not be degraded. However, since the demodulation/decoding operation, the validity checking operation, a scheduling operation, and a coding/modulation operation on the signal are required, transmission latency and transmission/reception complexity may increase.

Figure 3:
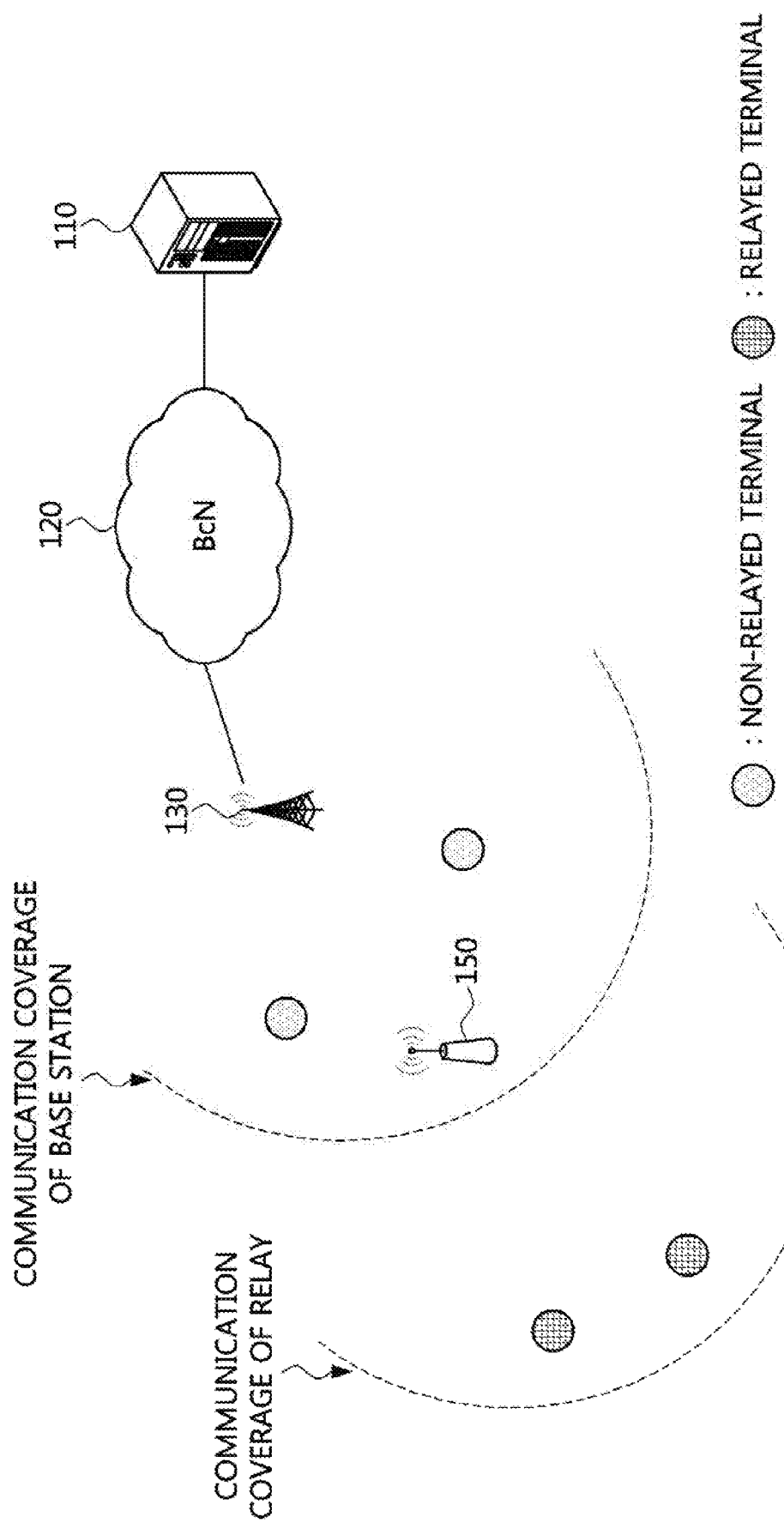
FIG. 3 is a conceptual diagram illustrating a second exemplary embodiment of a communication system.

FIG. 3 is a conceptual diagram illustrating a second exemplary embodiment of a communication system.

Referring to FIG. 3, a communication system may include the server 110, the BcN 120, a base station 130, a relay 150, and a terminal (e.g., a non-relayed terminal, a relayed terminal). The communication system may be a LPWAN. For example, the communication system may be a communication system for SigFox, LoRa, IEEE 802.15.4w, or NB-IoT.

The communication system shown in FIG. 3 may further include the relay 150 as compared to the communication system shown in FIG. 1. The relay 150 may operate in a repeater scheme or a relaying scheme. The relay 150 may retransmit a downlink message received from the base station 130, and may retransmit an uplink message received from the terminal (e.g., relayed terminal).

The non-relayed terminal may be located within communication coverage of the base station 130 and may directly communicate with the base station 130. The relayed terminal may be located outside the communication coverage of the base station 130. Since the relayed terminal may be located within communication coverage of the relay 150, the relayed terminal may communicate with the base station 130 through the relay 150. The relaying scheme between the base station 130 and the relayed terminal may be a 1-hop relaying scheme or a multi-hop relaying scheme.

In order to minimize interferences between terminals in a communication system, a frequency hopping technique, a random access procedure, a phase inversion (IQ inversion) technique, and the like may be used. In a communication system that supports the IQ inversion technique, interference may not occur between the IQ-inverted signal and the non-IQ-inverted signal. For example, a phase of the downlink message may be different from that of the uplink message, thereby minimizing interference.

Then, methods for transmitting and receiving a message in a communication system will be described. Even when a method (e.g., transmission or reception of a signal) to be performed in a first communication node among communication nodes is described, a corresponding second communication node may perform a method (e.g., reception or transmission of the signal) corresponding to the method performed in the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Figure 4:
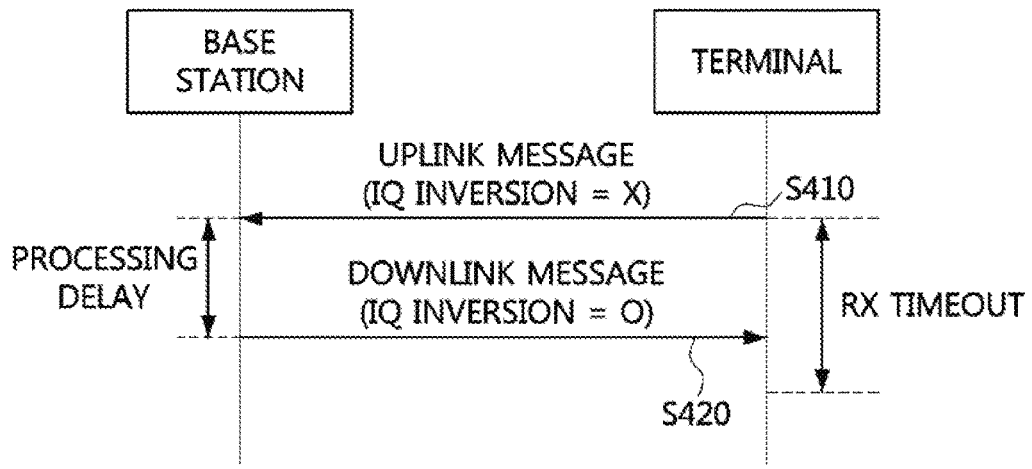
FIG. 4 is a sequence hart illustrating a first exemplary embodiment of a method of transmitting and receiving a message in a communication system.

FIG. 4 is a sequence hart illustrating a first exemplary embodiment of a method of transmitting and receiving a message in a communication system.

Referring to FIG. 4, a communication system may include a base station and a terminal. The base station may be the base stations 130-1 to 130-3 shown in FIG. 1 or the base station 130 shown in FIG. 3. The terminal may be the terminals 140-1 to 140-7 shown in FIG. 1 or the terminal (e.g., non-relayed terminal) shown in FIG. 3. Each of the base station and the terminal may be configured identically or similarly to the communication node 200 illustrated in FIG. 2.

The message transmitted from the base station to the terminal (e.g., medium access control (MAC) message) may be an IQ-inverted message, and the message transmitted from the terminal to the base station (e.g., MAC message) may be a non-IQ-inverted message.

For example, if there is data to be transmitted to the base station, the terminal may generate an uplink message including the data, and transmit the uplink message to the base station without IQ inversion (S410). The base station may receive the uplink message from the terminal. When the base station receives a downlink message of another base station and the uplink message of the terminal, since the phase of the uplink message is different from the phase of the downlink message, the base station may receive the uplink message of the terminal without interference from the downlink message of another base station.

The base station may transmit a downlink message, which is a response to the uplink message, to the terminal (S420). The downlink message transmitted from the base station to the terminal may be an IQ-inverted downlink phase. The terminal may receive the downlink message from the base station. When the terminal receives an uplink message of another terminal and the downlink message of the base station, since the phase of the downlink message is different from the phase of the uplink message, the terminal may obtain the downlink message of the base station without interference from the uplink message of another terminal.

If a downlink message, that is a response to the uplink message, is not received within a preconfigured period (e.g., period indicated by an RX timeout) from a time point of transmitting the uplink message, the terminal may determine that the transmission of the uplink message has failed. In this case, the terminal may retransmit the uplink message.

Meanwhile, when the communication system includes a relay, an operation of the relay may be as follows.

Figure 5:
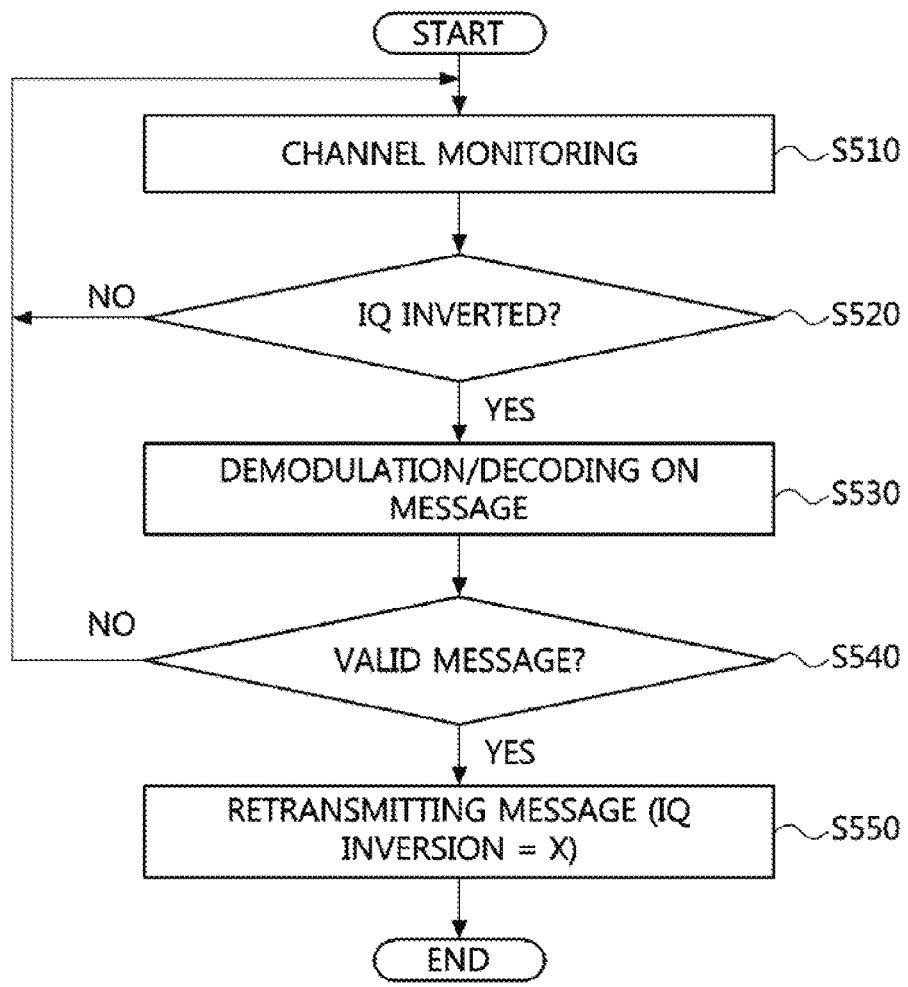
FIG. 5 is a sequence chart illustrating a second exemplary embodiment of a method of transmitting and receiving a message in a communication system.

FIG. 5 is a sequence chart illustrating a second exemplary embodiment of a method of transmitting and receiving a message in a communication system.

Referring to FIG. 5, a relay may monitor a channel to relay a message (S510). For example, the relay may monitor the channel at any time other than a transmission interval of a message. The channel may be classified into a normal channel and a relay channel, and the relay may perform the monitoring operation on the relay channel. The normal channel may be used for direct communication between the base station and the terminal, and the relay channel may be used for communication through the relay. A frequency band of the normal channel may be different from a frequency band of the relay channel.

When a message is received in the channel, the relay may identify whether the received message is IQ-inverted or not (S520). When the received message is not IQ-inverted, the relay may perform the step S510 again. On the other hand, when the received message is IQ-inverted, the relay may perform a demodulation/decoding operation on the corresponding message (S530). The relay may determine validity of the decoded message by performing a validity check (e.g., CRC) (S540). If the message is not valid, the relay may perform the step S510 again. If the message is valid, the relay may perform a coding/modulation operation on the message. Thereafter, the relay may retransmit the message (S550). The retransmitted message may not be IQ-inverted. If the retransmitted message is IQ-inverted, the corresponding message may be transmitted again by another relay. In this case, the message may be repeatedly transmitted between the relays.

Meanwhile, in a communication system including a base station, a relay, and a terminal, a network join procedure may be performed as follows.

Figure 6:
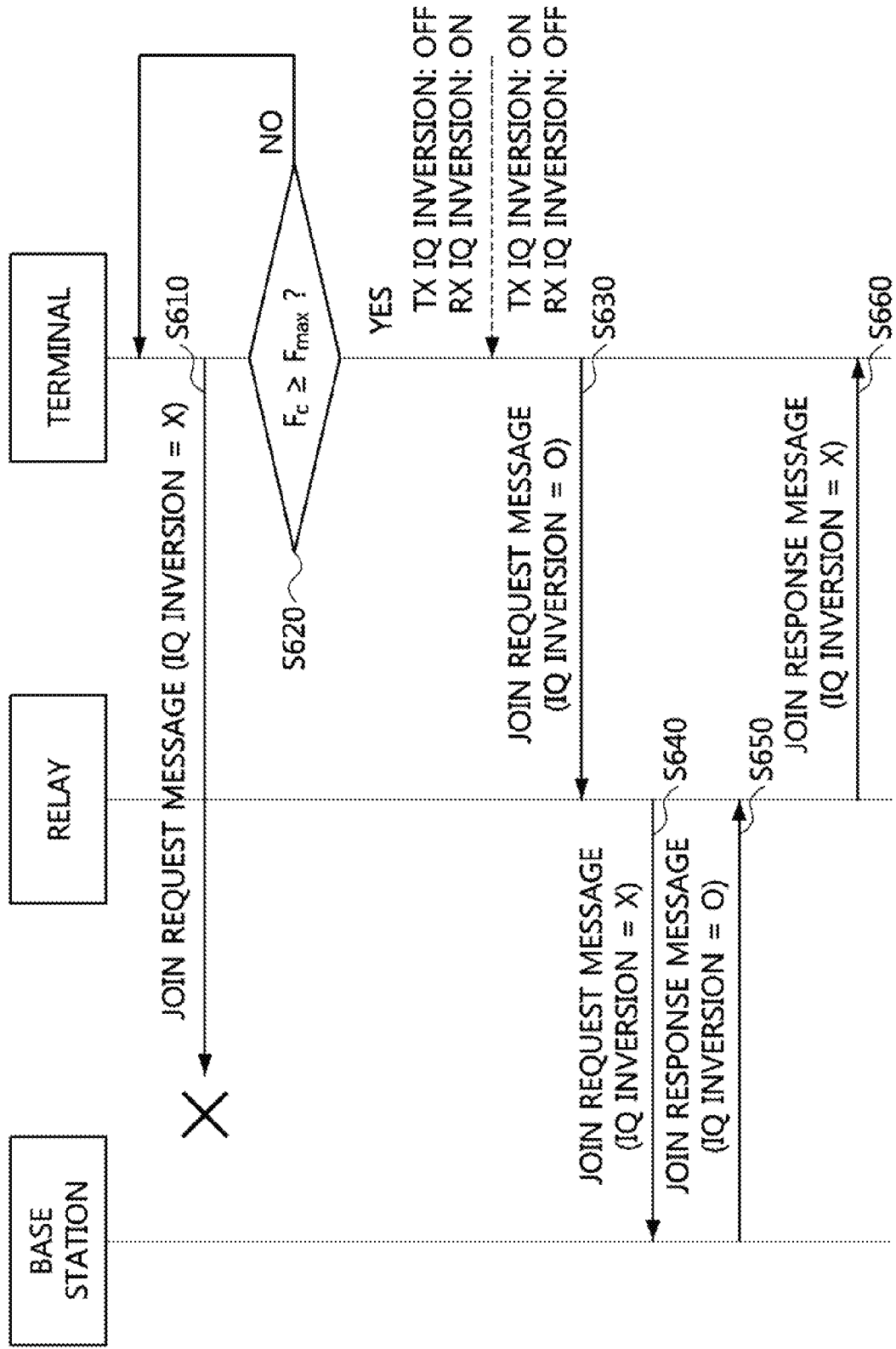
FIG. 6 is a sequence chart illustrating a third exemplary embodiment of a method of transmitting and receiving a message in a communication system.

FIG. 6 is a sequence chart illustrating a third exemplary embodiment of a method of transmitting and receiving a message in a communication system.

Referring to FIG. 6, a communication system may include a base station, a relay, and a terminal. The base station may be the base station 130 shown in FIG. 3, the relay may be the relay 150 shown in FIG. 3, and the terminal may be the terminal (e.g., relayed terminal) shown in FIG. 3. Each of the base station, the relay, and the terminal may be configured identically or similarly to the communication node 200 illustrated in FIG. 2.

If the terminal wants to join the network, the terminal may transmit a join request message to the base station (S610). The join request message transmitted in the step S610 may not be IQ-inverted. Here, a transmitter included in the terminal may operate to transmit a non-IQ-inverted message, and a receiver included in the terminal may operate to receive an IQ-inverted message. In case that a channel is classified into the normal channel and the relay channel, the join request message may be transmitted through the normal channel in the step S610.

When the terminal is located outside communication coverage of the base station, the base station may not transmit a join response message that is a response to the join request message because the base station cannot receive the join request message. Therefore, the terminal may not receive the join response message within a preconfigured period (e.g., period indicated by an RX timeout) from a time point of transmitting the join request message. In this case, the terminal may increase a transmission failure count of the join request message, and may compare a current transmission failure count $F_c$ with a preconfigured maximum transmission failure count $F_{max}$ (S620). If the current transmission failure count $F_c$ is less than the preconfigured maximum transmission failure number $F_{max}$, the terminal may retransmit the join request message in the step S610.

On the other hand, the relay may receive the join request message in the step S610. Since the join request message is not IQ-inverted, the relay may not relay the join request message of the terminal. Alternatively, in case that a channel is classified into the normal channel and the relay channel, and the join request message is transmitted through the normal channel in the step S610, the relay may not receive the join request message in the step S610 because the relay performs a monitoring operation on the relay channel.

If the current transmission failure counter $F_c$ is greater than or equal to the preconfigured maximum transmission failure count $F_{max}$, the terminal may determine that the terminal is located outside the communication coverage of the base station. In this case, the terminal may transmit a join request message through the relay. For example, the terminal may transmit the join request message that is IQ-inverted (S630). Here, a transmitter included in the terminal may operate to transmit an IQ-inverted message, and a receiver included in the terminal may operate to receive a non-IQ-inverted message. In addition, in the step S630, the join request message may be transmitted through the relay channel.

The relay may receive the join request message from the terminal by monitoring the channel (e.g., relay channel). When the join request message is received, the relay may perform the steps S520 to S550 shown in FIG. 5. For example, if the join request message is IQ-inverted and the join request message is valid, the relay may retransmit the join request message (S640). The join request message transmitted in the step S640 may not be IQ-inverted.

The base station may receive the join request message from the relay. When a demodulation/decoding operation on the join request message is successfully completed, the base station may generate a join response message that is a response to the join request message. The base station may transmit the IQ-inverted join response message (S650).

The relay may receive the join response message from the base station by monitoring the channel (e.g., relay channel). When the join response message is received, the relay may perform the steps S520 to S550 shown in FIG. 5. For example, if the join response message is IQ-inverted and the join response message is valid, the relay may retransmit the join response message (S660). The join response message transmitted in the step S660 may not be IQ-inverted.

The terminal may receive the join response message which is not IQ-inverted from the relay and perform a demodulation/decoding operation on the join response message. When the procedure for transmitting and receiving the join request and response messages is completed successfully, the terminal may join the network.

The above-described exemplary embodiments (e.g., steps S610 to S660) may be applied to a transmission and reception procedure of other messages as well as the transmission and reception procedure of the join request/response message.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   transmitting a first join request message to a base station without IQ inversion;
   when a number of failed transmissions of the first join request message is greater than or equal to a preconfigured threshold, transmitting an IQ-inverted second join request message to a relay; and
   receiving a join response message from the relay that is a response to the second join request message,
   wherein the second join request message is transmitted to the base station through the relay, and the join response message is generated by the base station.

2. The operation method according to claim 1, wherein the first join request message is transmitted through a first channel used for direct communication between the terminal and the base station, and the second join request message is transmitted through a second channel used for communication through the relay.

3. The operation method according to claim 1, wherein when the number of failed transmissions of the first join request message is less than the preconfigured threshold, a transmitter included in the terminal operates to transmit a non-IQ-inverted message, and a receiver included in the terminal operates to receive an IQ-inverted message.

4. The operation method according to claim 1, wherein when the number of failed transmissions of the first join request message is greater than or equal to the preconfigured threshold, a transmitter included in the terminal operates to transmit an IQ-inverted message, and a receiver included in the terminal operates to receive a non-IQ-inverted message.

5. The operation method according to claim 1, wherein the join response message is a join response message that is non-IQ-inverted.

6. An operation method of a relay in a communication system, the operation method comprising:
performing a monitoring operation on a channel;
performing a decoding operation on a message received in the channel when the message is IQ-inverted; and
retransmitting the message when the decoded message is valid,
wherein the retransmitted message is a message that is IQ-inverted.

7. The operation method according to claim 6, wherein the channel is a first channel used for communication through the relay, and the first channel is different from a second channel used for communication between a base station and a terminal.

8. The operation method according to claim 7, wherein the message is retransmitted through the first channel.

9. The operation method according to claim 6, wherein validity of the decoded message is determined based on a cyclic redundancy check (CRC).

10. The operation method according to claim 6, wherein a relaying operation is performed when an IQ-inverted message is received in the channel, and the relaying operation is not performed when a non-IQ-inverted message is received in the channel.

11. A terminal in a communication system, the terminal comprising:
a processor;
a transmitter performing a transmission operation according to control of the processor;
a receiver performing a reception operation according to control of the processor; and
a memory storing at least one instruction executable by the processor,
wherein the at least one instruction configures the processor to:
transmit a first join request message to a base station without IQ inversion;
when a number of failed transmissions of the first join request message is greater than or equal to a preconfigured threshold, transmit an IQ-inverted second join request message to a relay; and
receive a join response message from the relay that is a response to the second join request message,
wherein the second join request message is transmitted to the base station through the relay, and the join response message is generated by the base station.

12. The terminal according to claim 11, wherein the first join request message is transmitted through a first channel used for direct communication between the terminal and the base station, and the second join request message is transmitted through a second channel used for communication through the relay.

13. The terminal according to claim 11, wherein when the number of failed transmissions of the first join request message is greater than or equal to the preconfigured threshold, a transmitter included in the terminal operates to transmit an IQ-inverted message, and a receiver included in the terminal operates to receive a non-IQ-inverted message.

* * * * *